United States Patent

Holakovszky et al.

[11] Patent Number: 5,129,716
[45] Date of Patent: Jul. 14, 1992

[54] STEREOSCOPIC VIDEO IMAGE DISPLAY APPLIANCE WEARABLE ON HEAD LIKE SPECTACLES

[76] Inventors: László Holakovszky, Beregszász u.4o/I., Budapest, 1112; Károly Endrei, Fehéryári ût 86., Budapest 1119; László Kezi, Zugligeti ût 69., Budapest 1121; Károlyné Endrei, Tárogató ût 55., Budapest 1021, all of Hungary

[21] Appl. No.: 477,991
[22] PCT Filed: Oct. 21, 1988
[86] PCT No.: PCT/HU88/00068
  § 371 Date: Jun. 8, 1990
  § 102(e) Date: Jun. 8, 1990
[87] PCT Pub. No.: WO89/04102
  PCT Pub. Date: May 5, 1989

[30] Foreign Application Priority Data

Oct. 23, 1987 [HU] Hungary ............... 4783/87

[51] Int. Cl.⁵ ............................ G02C 7/14
[52] U.S. Cl. ........................ 351/50; 351/158; 359/462; 359/475; 359/630; 358/88
[58] Field of Search ......... 350/130, 141, 174, 618, 350/638; 351/41, 50, 51, 158, 201; 358/3, 88, 250

[56] References Cited

U.S. PATENT DOCUMENTS

| 3,059,519 | 10/1962 | Stanton ................. 350/638 |
| 3,216,778 | 11/1965 | Davies et al. | |
| 3,923,370 | 12/1975 | Mostrom ................ 350/174 |
| 4,706,117 | 11/1987 | Schoolman ............. 358/102 |
| 4,743,964 | 5/1988 | Allard et al. ............ 358/88 |
| 4,756,601 | 7/1988 | Schroder ................ 358/88 |
| 4,806,011 | 2/1989 | Bettinger ................ 351/50 |
| 4,874,235 | 10/1989 | Webster ................. 351/158 |
| 4,933,755 | 6/1990 | Dahl et al. .............. 358/88 |
| 4,969,724 | 11/1990 | Ellis ..................... 350/174 |
| 4,994,794 | 2/1991 | Price et al. ............. 358/88 |
| 5,034,809 | 7/1991 | Katoh .................... 358/88 |

FOREIGN PATENT DOCUMENTS 1103961 4/1961 Fed. Rep. of Germany ...... 351/158

Primary Examiner—Rodney B. Bovernick
Assistant Examiner—J. P. Ryan
Attorney, Agent, or Firm—Skjerven, Morrill, MacPherson, Franklin & Friel

[57] ABSTRACT

Object of invention is such an appliance which is suitable for stereoscopic displaying of video images. It is wearable on head having a common stiff frame with two video image displays built in it; then an optical system, containing lenses and mirrors or prisms, is located, arranged symmetrically. Video image diplays (1), e.g. cathode ray tubes, while wearing on head, are located near the temples; in front of the screen (3) there is a mirror or a prism having reflecting surface, having of 45°-75° angles with the plain of the screen on two sides symetrically fitting into optical train between the screen (3) and the concerned pupil, then a lense or lense-system (8), then there is a reflecting mirror (7) having the area not greater than that of the average pupil, in front of the pupils (5), fixing of this mirror (7) is made of transparent material or is covered. The enumerated elements are built in the frame cover having many parts, from which part left and right side cover (9) contain video image display (1), mirrors or prisms (4) in front of the screen (3) and lenses or lense-systems (8), its connecting element (12) is transparent material and/or is constructed out of the virtual sight and rests on the ridge of the nose.

30 Claims, 4 Drawing Sheets

STEREOSCOPIC VIDEO IMAGE DISPLAY APPLIANCE WEARABLE ON HEAD LIKE SPECTACLES

TECHNICAL FIELD

The invention relates to an appliance serving for stereoscopic image display which can be worn on head and it has two video displays mounted in a common stiff frame and there is an optical system consisting of lenses and mirrors arranged symmetrically on the right and left sides of the head in such an order that it ensures simultaneous watching of both the surroundings and tv image practically without disturbing each other.

BACKGROUND ART

It is a general endeavour in case of most people to spend time of travelling and waiting in a more useful way, getting informed or entertaining. Its traditional means besides newspapers and books are the widespread walkman (cassette player with stereo earphones) and the radio walkman (earphones with radio receiver).

In spite of the fact that most popular amusement in the homes preceding reading and listening to radio is watching tv and video, however it has not spread in public vehicles, in streets, etc. Its most important reasons are: screen size of miniaturized tv is too small to enjoy the image: watching small picture for a long time strains the eyes; increasing the picture is limited because of claim of portability, ability to keep it in a pocket, on the other hand the limit that screen held in hands can be maximum in an arm's length. Consequently we increase size of picture in vain; over a certain limit picture seen from a too close distance shows line-structure; screen of tv set held in hands, because of sight, is watched by people standing around, which can be disturbing; at day-light or at strong inner lighting image fades or gets contrastless.

Such an appliance is suitable for solving the problem which: 1) light, 2) small sized, 3) picture appears in a good distance (i.e. 2-3 meters), 4) picture cannot be seen by others, 5) the appliance need not be held in hands, 6) while watching it, the person can see his surroundings free, 7) screen is strongly shaded from outer light, in this way it is perfectly contrasty.

The U.S. Pat. No. 4,310,849 is known (Jan. 12, 1982, Stuart M. Glass, "Stereoscopic video system") which is a stereo image and voice broadcasting unit fixed to the head, where tv pictures of right and left type is forwarded to the left and right eyes by fibreglass optics, voices forwarded to ears by stereo earphones. The appliance can be fixed to the head by head band system. Its disadvantages are: band system is heavy and big, wearing it is uncomfortable and striking, and the band in front of the eyes disturbs looking around, i.e. its wearer can see only tv screen and not the surroundings. Tv mounted into helmet is described in G. V. Mamchev's book "The Stereo Television" (Mûszaki Könyvkiadó, Budapest - Mir Publishing House, Moscow, 1981, page 58). A special cover is fixed to the forehead part of the viewer's helmet in which two cathode ray tubes are situated almost vertically with looking downwards above the left and right eyes, and viewer sees the two screens through a lense and a mirror. The helmet is heavy and big in this case too, and the cover including the mirrors disables the viewer to see the surroundings free.

The U.S. Pat. No. 4,559,555 has the same operation principle (Dec. 17, 1985, Arnold Schoolman, "Stereoscopic viewing system"), a tv set mounted in a helmet as described by its FIG. 5-7, arrangement of elements and its disadvantages are similar.

The U.S. Pat. No. 4,706,117 (Nov. 10, 1987, Arnold Schoolman, "Stereo Laser disc viewing system") describes a tv set of various construction fixed to the head. According to its FIG. 6-8 there is a protruding extension is a big closed unit in front of the viewer's eyes, in which there are two built-in objectives, two screens with liquid crystal and two lamps for lighting the screen and the extension is fixed to the head by a head band system. According to appliance described in its FIG. 10 there are two lenses in front of the eyes and beyond them there are two LCD screens. In the cases of appliance mentioned in above patent description, the protruding extension makes possible only watching tv and it totally closes the surroundings and their fixing system are big and uncomfortable.

FRG Patent No. DE 3534162 A1 (Nov. 13, 1986, Wolfgang Andrich, "Tragbarer videomonitor") describes such a non-stereoscopic tv set mounted into a helmet, in which case there is a tv image display on top of viewer's head, its image is projected in the eye by a first lense, a mirror, a second lense and a transparent mirror. Its disadvantage is the big sized helmet and the fact that semi-transparent mirror is an ambiguous solution, as it does not make possible to see either the surroundings or tv image undisturbed way, because both can be seen on the same location projected on each other.

At last mention U.S. Pat. No. 4,636,866 (Dec. 22, 1983, Noburu Hattori, "Personal Liquid Crystal Image Display") which describes a protruding extension constructed as close unit which can be fixed to the head by a helmet. There are one or two LCD screens in the protruding extension seen by viewer through a lense or lenses and mirrors. Disadvantages of the appliance are similar to the previous ones.

To summarize all these, common characteristic feature of known solutions realising tv image display wearable on the head are the relatively big size and weight that makes its wearing on the one hand uncomfortable and tiring, on the other hand wearing such helmets in the streets, in public vehicles, etc. is striking. Possibilities of using them are further limited by the fact that user of this appliance has limited ability to orientate, that is why this appliance can be used for watching tv only under undisturbed circumstances.

DISCLOSURE OF THE INVENTION

The aim of our invention is to eliminate above shortcomings to ensure new usage circle. Our invention is based on the recognition that free outlook on the surroundings—beside enjoying perfect image fading into the surroundings in a pleasant way—can be ensured by a small sized, pleasant for wearing, esthetic appliance in case we combine suitable optical and electronical principles during designing the appliance.

General solution of the task is such an appliance which has image displays, e.g. cathode ray tubes, located while wearing it on the head in front of the temples; in front of the screens and fitting into the optical train between the screen and the appropriate pupil as well as on the two sides simmetrically there is a mirror or prism with reflecting surface each, having 45°-75° angles with the plain of the screen, then a lense or lense system each, then in the axis of the eyes, in front of the pupils there is a mirror each fixed, essentially, without any optical shading elements, having a reflecting surface of maximum double of the iris's average area, which fits into optical train according to the outlines of the screen and the enumerated elements are built in such a frame-cover consisting of several parts, and from which the left and right cover contain the image displays, e.g. cathode ray tubes, mirrors or prisms and lenses or lense systems being in front of the screen, and its joining element allows free outlook, being advantageously transparent or being beyond the visual field and rests on the ridge of the nose.

BRIEF DESCRIPTION OF DRAWINGS

We describe our invention in details with the help of embodyment examples. Figures used for description show the following.

MODE OF CARRYING OUT THE INVENTION

Figure 1:
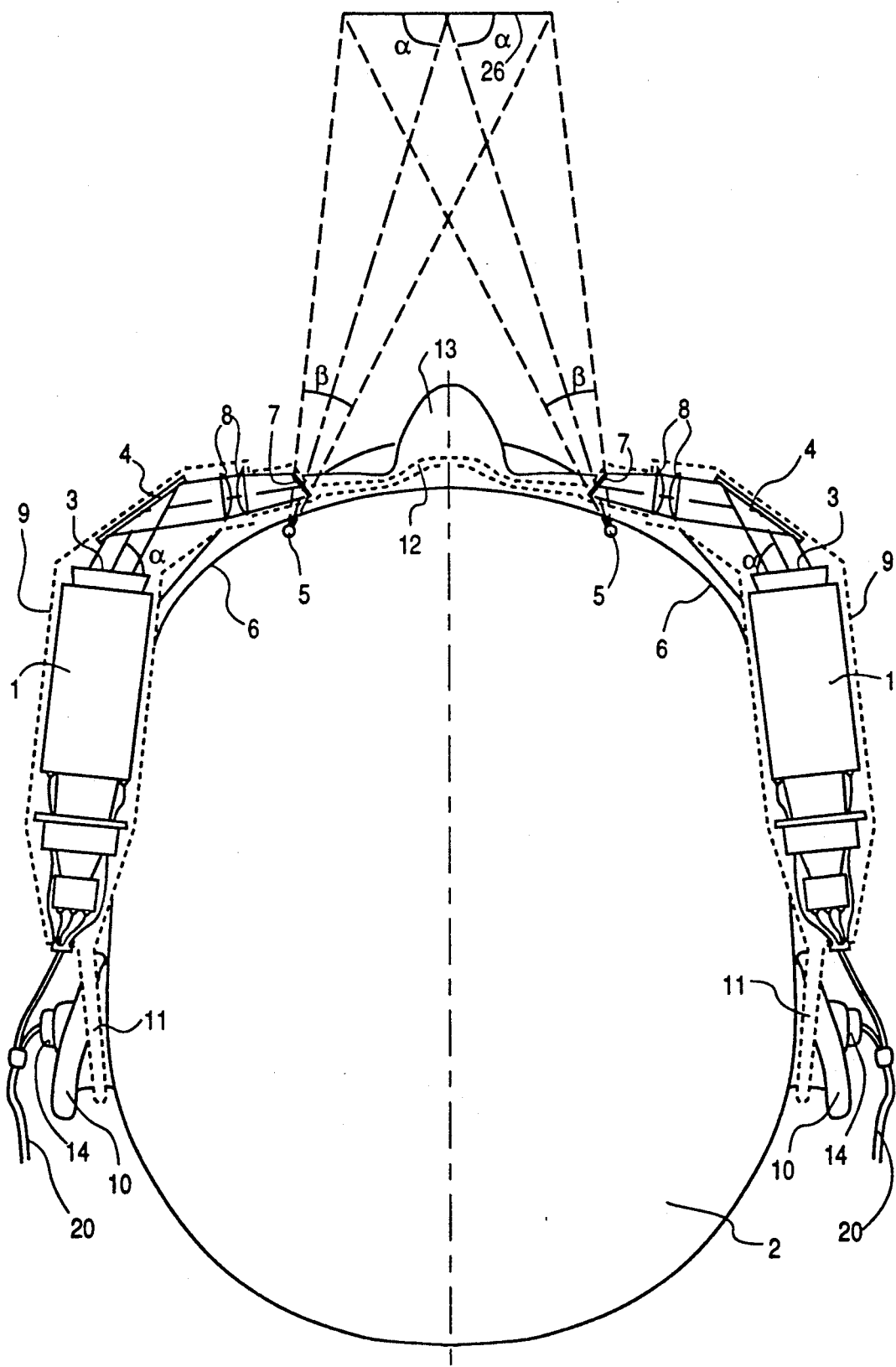
FIG. 1: Sketchy arrangement of elements of the appliance according to the invention in top view in case of cathode ray tubes.

According to FIG. 1 video image displays (1) are situated along left and right temples of the person's head (2) with screens (3) looking forward. Because of symmetrical relations in the future we describe only arrangement of the left side. In front of the screen (3) an optical element with reflecting surface, i.e. a mirror or a prism is situated. In front of the pupil (5) of the left eye, we have described only its top view place because of uncovering of eyebrows (6), the mirror (7) is situated in 1-3 cm's distance, which is a metal mirror so as to avoid double reflecting. Its shape advantageously is a lying rectangle suitably to screen (3) to be reflected, even more punctually it is such a trapezium whose longer side of the parallel ones is farther from the pupil (5). It is placed a bit to the right from the axis of the eye in front of the pupil (5). The lense or lense system (8) is situated between the mirror or prism (4) and the mirror (7), with optical axis approximately coinsiding with quadrat connecting centre of reflecting surfaces, their focus is longer than length of the quadrant deflecting according to optical train which connects optical main point with central point of screen (3). The video image display (1), the mirror or prism (4) and the lense or lense system (8) are built in the cover (9), whose end is open at the lense or lense system (8). The fixing element (11) is joined to the end of the cover (9) at the ear, its shape is advantageously is turning downwards similarly to the traditional spectacle-temple.

Regarding both sides of FIG. 1, joining element (12) stiffly connects left and right covers (9) which is made of transparent material or because of its stereoscopic construction it does not disturb outlook. Mirrors (7) are stiffly fixed to the joining elements (12). The middle of the joining element (12) is advantageously constructed like an arch lying on the ridge of the nose (13). Display driving circuit can also be placed beside the video image display (1) in the cover (9). The electric cables (20) lead through the opening of the cover (9) lead to the unit serving as the source of image and voice signals as well as feeding voltage which can be a tv-tuner, image recorder-player appliance, computer, video camera, etc. Earphones (14) can be placed outside of the cover (9) or can be built in the lengthened over (9); in special cases, as e.g. connecting to computer, earphones (14) can be omitted.

Figure 2:
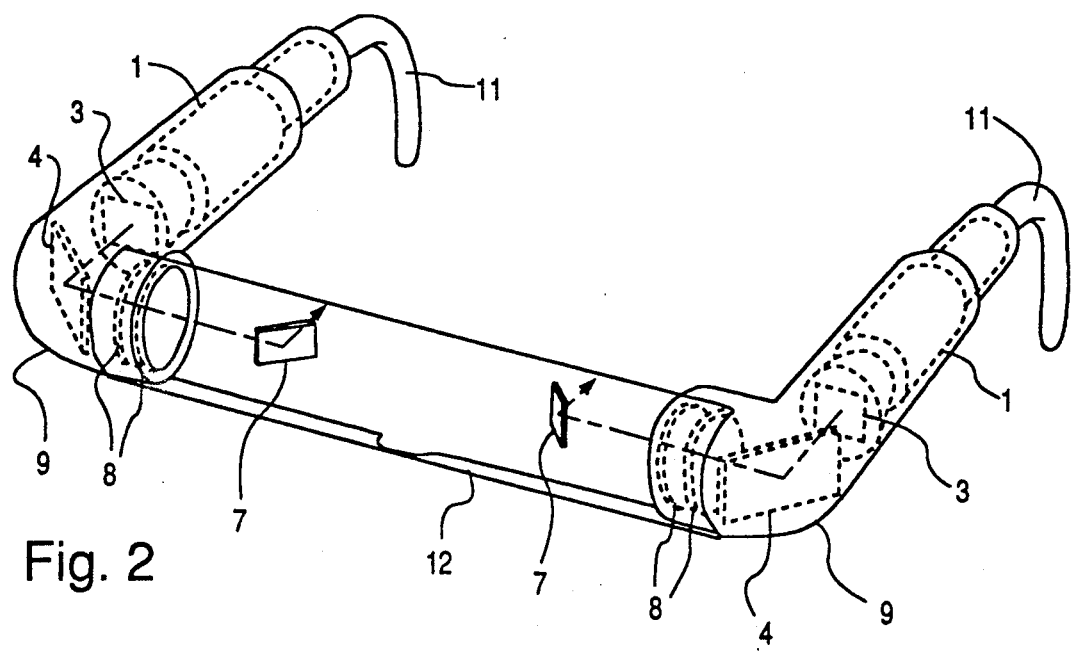
FIG. 2: Appliance according to the invention, perspektively in case of cathode ray tubes.

FIG. 2 shows one way of construction of the joining element (12). Both ends of cylinder shaped body made of thin transparent plate, advantageously of plastic, are fixed to the covers (9), e.g. glued. Fixing mirrors (7) to the joining element (12) can be done either with distortion free transparent elements (e.g. glass or plastic plates), either with elements being behind and covered by the mirror (7).

Figure 3:
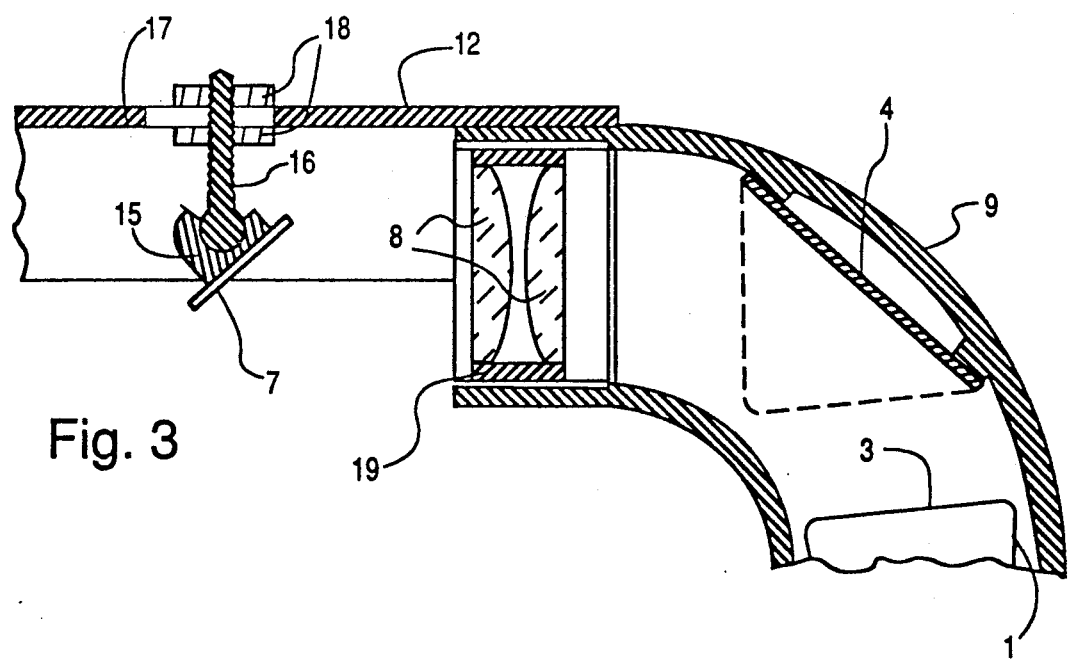
FIG. 3: Sectional drawing of a part of the appliance according to FIG. 2.

Embodyment of the latter is shown in FIG. 3. Ball joint or journal joint (11) is fixed to the backside of the mirror (7), advantageously glued, and trained end of inner component pierce through vertical opening (17) of the joining element (12). The joining element (12) is surrounded by screw-nuts. In this way fine setting of the mirror (7) in all directions is possible. Lense or lense-system (8) is supplied with setting element which can be e.g. tube with screw-thread (19).

Figure 4:
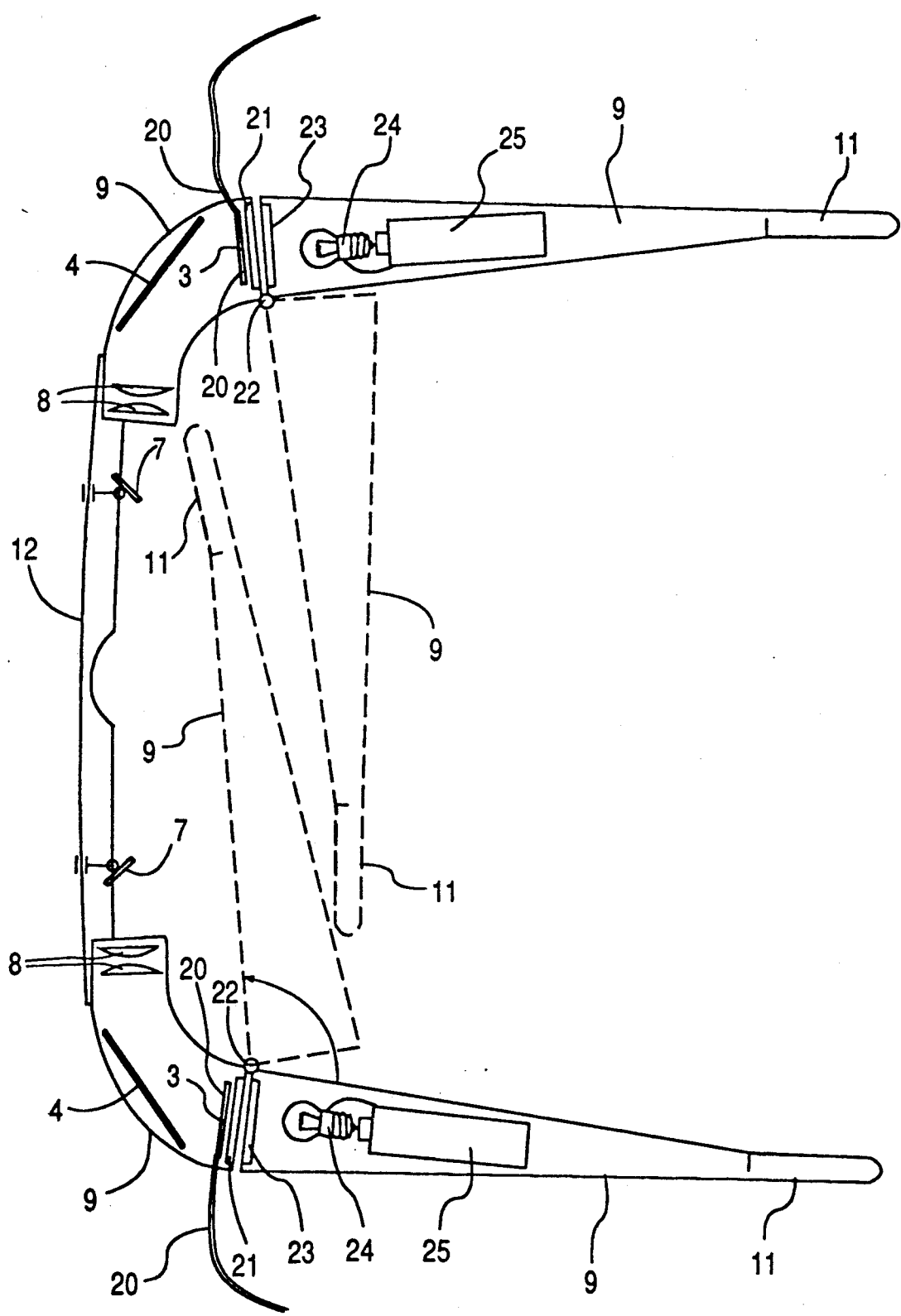
FIG. 4: Sketchy arrangement of elements of appliance according to invention in top view in case of LCD screens.

In FIG. 4 video image display (1) is an LCD appliance built in the cover (9), as per arrangement is shown, behind it a light diffusor i.e. a semi-transparent plate e.g. a mat pane, spreading light homogenously, is situated. Cover (9) is divided into two parts which are turnably connected with a joint (22), in this way two temples of the appliance, similarly to spectacles, can be folded. Open ends of previous covering parts are closed serviceable with light diffusors (21) and (23), e.g. mat panes as covering plates. Light-source of white colour is built in behind the light diffusor (23) which has switchable electric connection with an electric source (25) built in the cover (9). The cover (9) ends in the fixing element (11) whose shape is preferably curving downwards.

Characterized according to its operation, the beam starting from the screen (3) reflecting on the mirror or prism (4), focused by the lense or lense-system (8) and at last reflecting on the mirror (7) gets in the eye through the pupil. After all the viewer person looks with both eyes in the direction of the mirror (7), behind it, at the location of the virtual image (26), which is the enlarged image of the screen (3) and seems in bigger distance than that is. That is why the two images in the case of both equal images and stereo image pairs/images, recorded from left and right visual angle/ it becomes a single image. In the case of stereo image pair this picture has the virtual view of three dimensions.

Preferably we choose the size of the screen (3) and enlarging lense-system (8) so that angle $\beta$ should be approximately between 10° and 15°, this equals with the angle of watching tv from 2-3 m. In case we move lense or lense-system farther along its optical axis from the mirror or prism (4) and at the same time from the screen (3), size and distance of virtual image (26) increases at the same angle $\beta$. In order to make distance and size of the picture the most comfortable, we supply setting element to the lense or lense-system (8) which can operate separately or together. Size and location of mirrors (7) are exactly proper for both eyes to see just the screen (3) and only the screen. In other words the mirrors (7) cause only minimum shading for the person watching the outer surroundings. The person sees the virtual image (26) by itself, without any dark frame put on image of the current outer environment, in other words tv image starts to float in front of background of the surroundings. As it is seen from the above to make virtual tv images, seen by left or right eye, covered it requires precise setting of mirrors (7) one according to the person's eyes. Setting can be done by turning or paralelly slipping the mirrors (7).

Figure 5:
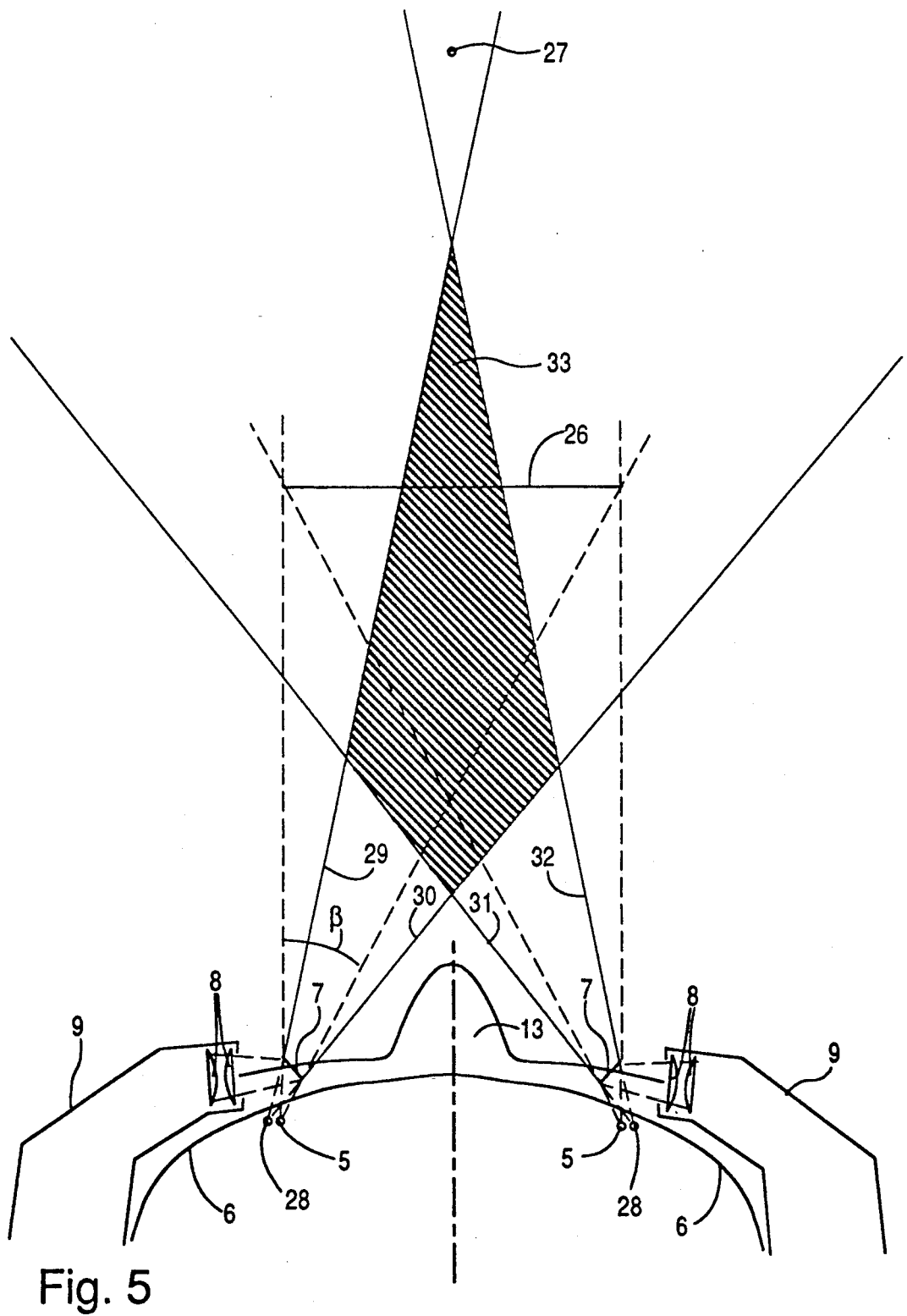
FIG. 5: Uncovering relation of mirrors being in front of the eyes in vertical plain.

FIG. 5 explains or shows that mirrors (7) practically do not or hardly disable the person to watch the surroundings free from superimposed images. As mirrors (7) are not transparent, while watching visual image (26), the objects surroundings behind them are covered. However if e.g. viewer looks at a much remote point (27), he sees it also with both eyes, though this point should be uncovered behind the visual image (26). Explanation of the phenomenon is that fact that pupils of eyes, looking far, move away from each other because of little correcting turn of the eyeballs, in this way pupils in situation (28) can see better behind the mirror (7). After all, only the lined field (33) surrounded by half lines (29) and (30), as well as by (31) and (32) (starting from pupils in situation (28) and touching edges of mirrors (7) remain uncovered for both eyes. The thesis is widely true according to which while watching visual image (26) with T territory (uncovering the surroundings) watching any other point being closer or farther, uncovering for both eyes in smaller than T. At last as pupil is not punctiform, it has extension, at above phenomena contours become blurred which increases validity of previous thesis.

As a summery, our invention is a spectacle shaped video image display which makes possible not only undisturbed watching of tv image but also of the outer surroundings or with smaller uncovering that previous tv image.

From the described embodyments we can see that depending on the sort of image display appliance can be constructed in various ways. In the case of image display with liquid crystal electronic driving display with liquid crystal can be built in the cover (9) according to FIG. 4, even tv tuner too, in latter case it is complete tv receiver—with the addition of areal and earphones. In case of coloured image display in one basic colour (e.g. blue) on one screen and in the mixture of the other two basic colours (red and green) on the other screen, then in viewer's mind colours mix in a binocular way and the stereoscopic image seems to be coloured.

We claim:

1. A video image display appliance for wearing on a head, the head having an eye for receiving light from a field of vision, said appliance comprising:
    a frame having a first portion disposed adjacent the eye, said first portion defining a transparent section through which light from the field of vision passes and enters the eye, and a second portion connected to said first portion adjacent the eye;
    a video image display mounted on said second portion and projecting an image along an optical train; and
    an opaque reflective means connected to said first portion and disposed on said optical train for receiving and reflecting said image toward the eye, said opaque reflective means being disposed 1 to 3 centimeters from the eye, said opaque reflective means being disposed to block a portion of the light from the field of vision.

2. A video image display appliance for wearing on a head, said head having an eye for receiving light from a field of vision, the eye having a primary line of sight, said appliance comprising:
    a frame having a first portion disposed adjacent the eye, said first portion defining a transparent section through which light from the field of vision passes and enters the eye, and a second portion connected to said first portion adjacent the eye;
    a video image display mounted on said second portion and projecting an image along an optical train; and
    an opaque reflective means connected to said first portion and disposed on said optical train for receiving and reflecting said image toward the eye, said opaque reflective means being disposed below or intersecting said primary line of sight to block a portion of the light from the field of vision.

3. A video image display appliance of claims 1 or 2 further comprising a first reflective surface disposed on said frame between said video image display and said opaque reflective means for receiving said image projected by said video image display and reflecting said image along said optical train.

4. A video image display appliance of claim 3 further comprising a focusing means disposed between said first reflective surface and said opaque reflective means for receiving said image reflected by said first reflective surface and focusing said image at a predetermined focal length on said opaque reflective means.

5. A video image display appliance of claim 4 wherein said focusing means comprises a lens mounted on said frame.

6. A video image display appliance of claim 5 wherein said lens is movable mounted by a lens mounting means such that said lens is reciprocally adjustable in a direction of an optical axis of said lens.

7. A video image display appliance of claim 6 wherein said lens mounting means comprises a tube having a screw thread within which is mounted said lens.

8. A video image display appliance of claim 4 further comprising:
    said first portion of said frame defining a second transparent section disposed in from of a second eye, said frame having a third portion connected to said first portion adjacent the second eye;
    a second video image display disposed on said third portion and projecting a second image along a second optical train;
    a second opaque reflective means connected to said first portion and disposed on said optical train for receiving and reflecting said image into the second eye, said second opaque reflective means being disposed to block a portion of a field of view of the second eye;
    a third reflective surface disposed on said frame between said second video image display and said second opaque reflective means for receiving said second image projected by said second video image display and reflecting said image along said second optical train; and
    a second focusing means disposed between said third reflective surface and said second opaque reflective means for receiving said second image reflected by said third reflective surface and focusing said second image at said predetermined focal length on said second opaque reflective means 9. A video image display appliance of claim 8 wherein said first image is one or more first colors, and said second image is one or more second colors.

10. A video image display appliance of claim 8 wherein said first and second images are substantially the same.

11. A video image display appliance of claim 8 wherein the combination of said first and second images viewed by said first and second eyes creates a stereoscopic video image.

12. A video image display appliance of claim 4 wherein said opaque reflective means comprises a metal mirror surface.

13. A video image display appliance of claim 4 wherein said video image display comprises a cathode ray tube.

14. A video image display appliance of claim 4 wherein said video image display comprises a liquid crystal display and a light source, said light source being disposed to emit light through said liquid crystal display.

15. A video image display appliance of claim 3 wherein said opaque reflective means comprises a metal mirror surface.

16. A video image display appliance of claim 15 wherein said video image display comprises a cathode ray tube.

17. A video image display appliance of claim 5 wherein said video image display comprises a liquid crystal display and a light source, said light source being disposed to emit light through said liquid crystal display.

18. A video image display appliance of claim 3 wherein said video image display comprises a cathode ray tube.

19. A video image display appliance of claim 3 wherein said video image display comprises a liquid crystal display and a light source, said light source being disposed to emit light through said liquid crystal display.

20. A video image display appliance of any one claims 1 or 2 wherein said video image display comprises a cathode ray tube.

21. A video image display appliance of any one of claims 1 or 2 wherein said video image display comprises a liquid crystal display and a light source, said light source being disposed to emit light through said liquid crystal display.

22. A video image display appliance of claim 21 wherein said second portion of said frame is foldably connected to said first portion of said frame by means of a joint.

23. A video image display appliance of any one of claims 1 or 2 further comprising a display driving circuit electrically connected to said image display.

24. A video image display appliance of claim 23 wherein said display driving circuit comprises a television tuner.

25. A video image display appliance of claim 23 wherein said display driving circuit comprises a video recorder/player.

26. A video image display appliance of claim 23 wherein said display driving circuit comprises a computer.

27. A video image display appliance of claim 23 wherein said display driving circuit comprises a video camera.

28. A video image display appliance according to claim 1 wherein the eye has a primary line of sight, and said opaque reflective means being disposed below or intersecting said primary line of sight.

29. A video image display appliance according to claims 1 or 2 further comprising at least one earphone disposed on said second or third portions of said frame.

30. A video image display appliance according to claim 2 wherein said opaque reflective means is disposed 1 to 3 cm from the eye.

* * * * *